(12) United States Patent
Hsu (10) Patent No.: US 6,804,861 B2
(45) Date of Patent: Oct. 19, 2004

(54) ROTATION SHAFT MECHANISM OF DISPLAY PORTION OF PORTABLE COMPUTER

(75) Inventor: Hsiang-Ti Hsu, Kao Hsiung (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 10/309,013

(22) Filed: Dec. 4, 2002

(65) Prior Publication Data

US 2004/0107540 A1 Jun. 10, 2004

(51) Int. Cl.⁷ ................................................. E05D 3/06
(52) U.S. Cl. .............................. 16/366; 16/367; 16/374; 16/386
(58) Field of Search ...................... 16/367, 366, 374, 16/376, 335, 380; 361/680, 681, 682, 683; 248/917, 919, 920–922, 125.1, 125.8, 278.1

(56) References Cited

U.S. PATENT DOCUMENTS

| | | | | |
|---|---|---|---|---|
| 5,016,849 A | * | 5/1991 | Wu | 248/176.3 |
| 5,205,017 A | * | 4/1993 | Wang | 16/367 |
| 5,335,142 A | * | 8/1994 | Anderson | 361/681 |
| 5,632,066 A | * | 5/1997 | Huong | 16/338 |
| 6,163,928 A | * | 12/2000 | Chung | 16/342 |
| 6,189,842 B1 | * | 2/2001 | Bergeron Gull et al. | 248/125.1 |
| 6,256,837 B1 | * | 7/2001 | Lan et al. | 16/334 |
| 6,347,433 B1 | * | 2/2002 | Novin et al. | 16/367 |
| 6,427,288 B1 | * | 8/2002 | Saito | 16/361 |

FOREIGN PATENT DOCUMENTS

| | | | |
|---|---|---|---|
| JP | 11-257342 | * | 9/1999 |
| JP | 2000-170438 | * | 6/2000 |
| JP | 2000-54715 | * | 2/2002 |
| JP | 2002-155923 | * | 5/2002 |

* cited by examiner

Primary Examiner—Chuck Y. Mah
(74) Attorney, Agent, or Firm—Birch, Stewart, Kolasch & Birch, LLP (57) ABSTRACT

A rotation shaft mechanism is proposed, whereby a display portion of a portable computer is upheld when the display portion is lifted, so that turning of the display portion will not rub against the surface of base portion of the portable computer. The rotation shaft mechanism includes a vertical shaft and two horizontal shafts each has an eccentric protuberance. The vertical shaft includes a first component having a pair of symmetric projective ears and a cylinder body, a second component slipped onto the cylinder body, and a third component also slipped onto the cylinder body. The horizontal shafts pass through and join the projective ears. The second component has projective walls corresponding to the eccentric protuberances. The first and second components interfere each other to rotate synchronously. An elastic component is disposed between the lower portion of the cylinder body and the bottom face of the third component.

8 Claims, 8 Drawing Sheets

ROTATION SHAFT MECHANISM OF DISPLAY PORTION OF PORTABLE COMPUTER

FIELD OF THE INVENTION

The present invention relates to a rotation shaft mechanism of a display portion of a portable computer and, more particularly, to a rotation shaft mechanism, whereby a display portion is upheld at the same time when it has been opened up, to avoid that turning of the display portion from contacting and rubbing against a seat portion of the portable computer. Moreover, as the display portion is not opened up, the rotation shaft mechanism helps the portable computer fully closed.

BACKGROUND OF THE INVENTION

Figure 1:
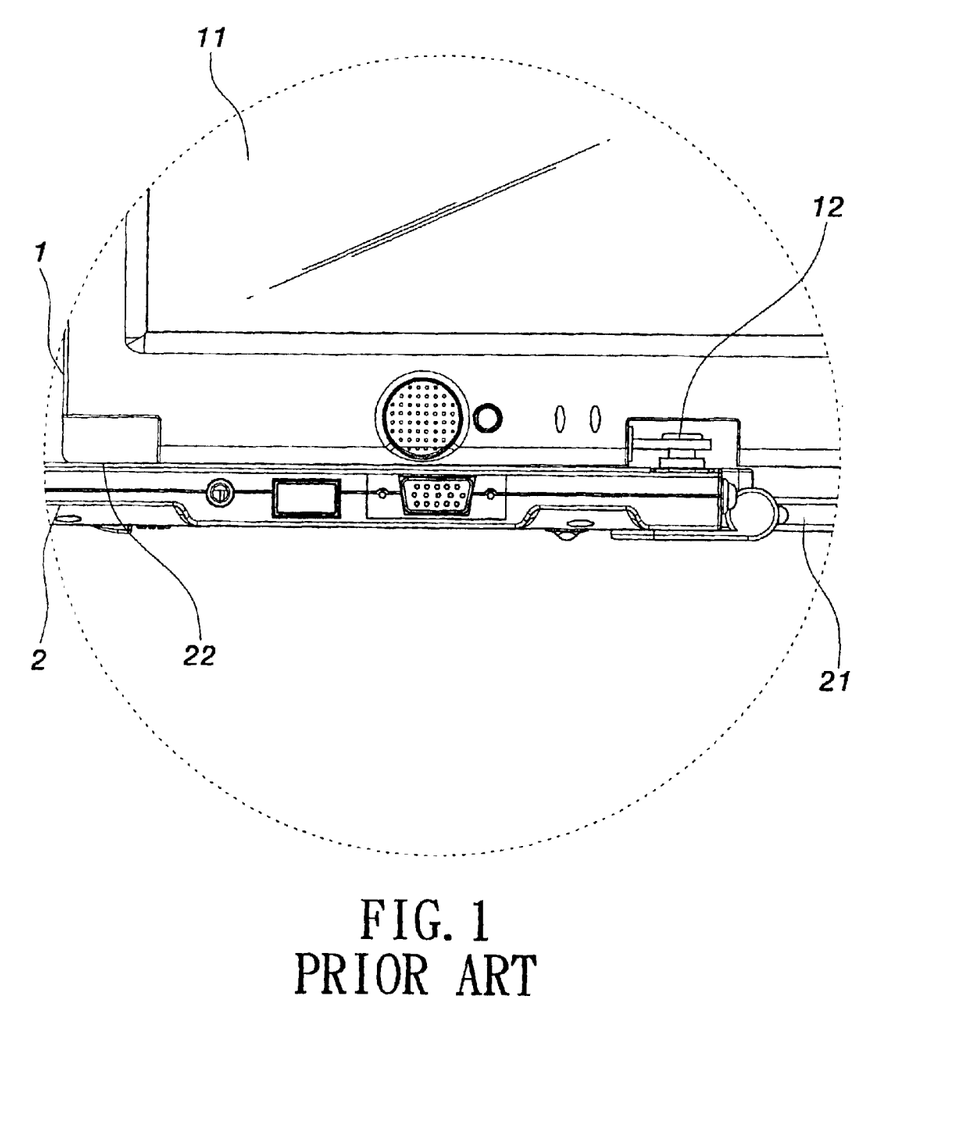
FIG. 1 is a side view of a conventional portable computer after its display portion is opened up and turned around.

At the present time, most portable computers have a rotatable display portion in design. As shown in FIG. 1, a conventional portable computer having a rotatable display portion 1 has a rotation shaft 12, which is pivotally connected at a rotatable vertical shaft and serves as a rotatable horizontal shaft. The display portion 1 is opened up through the help of the horizontal shaft, and turned around through the help of the vertical shaft. Besides, a handle 21 is disposed at a base portion 2 of the conventional portable computer for of the portable computer. The display portion 1 also has a display screen 11.

For the conventional computer using the rotation shaft 12, because the stability of the rotation shaft 12 is insufficient, when the display portion 1 is opened up and turned around, the bottom edge of the display portion 1 is supposed to rub against top surface of the base portion 2 at somewhere such as 22, as shown in FIG. 1. This rubbing position 22 will straightly scratch top surface of the base portion 2 and destruct its delicacy, or even get stuck by keys on the base portion 2 when the display portion 1 is turned around, hence resulting in problems like scratches, erroneous key touching, and non-smooth rotation.

Figure 2:
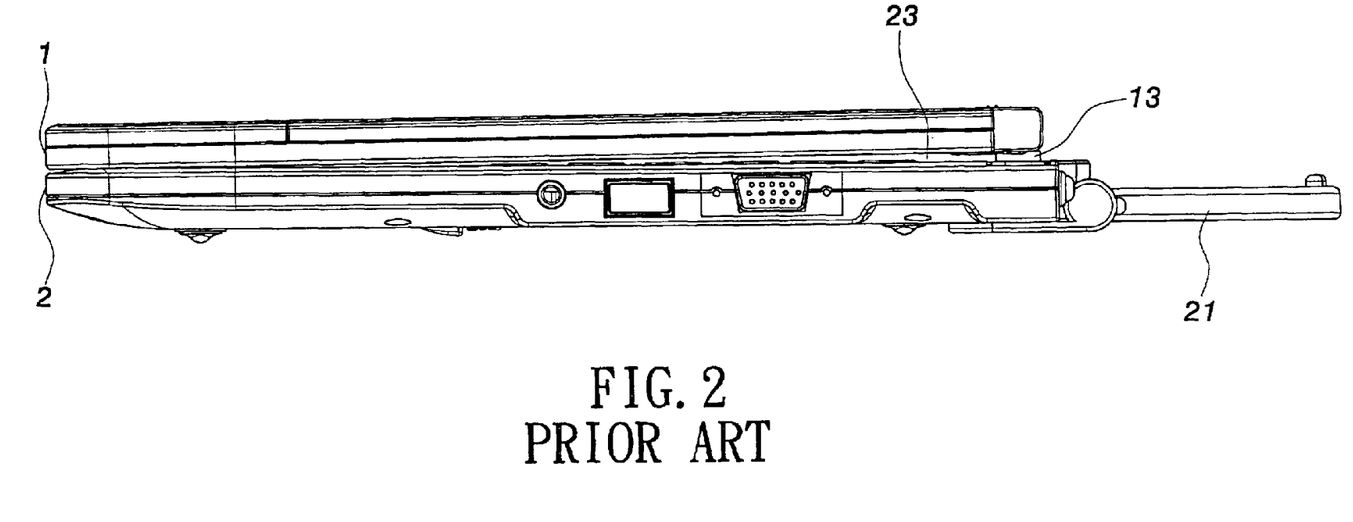
FIG. 2 is a side view of a conventional portable computer after its display portion is opened up.

As shown in FIG. 2, in order to avoid the problems in FIG. 1, the rotation shaft has been improved to become a lengthened rotation shaft 13 so as to lift the display portion 1 a little bit. The above problems will not occur when the display portion 1 is opened up and turned around. However, the lengthened rotation shaft 13 will cause a gap 23 between the display portion 1 and base portion 2 will have a gap 23 therebetween due to the setting of the lengthened rotation shaft 13, when the display portion 1 is opened up, leading the portable computer to not being closed completely.

Accordingly, the present invention aims to provide a rotation shaft mechanism of display portion of a portable computer to resolve the problems in the prior art.

SUMMARY OF THE INVENTION

The primary object of the present invention is to provide a rotation shaft mechanism of a display portion of a portable computer so as to avoid scratches on the surface of the base portion when the display portion is turned around and the existence of a gap between the display portion and the seat portion when the display portion is opened up.

To achieve the above object, the present invention provides a rotation shaft mechanism of a display portion of a portable computer. The portable computer comprises a display portion, a base portion, and a rotation shaft mechanism disposed therebetween. The rotation shaft mechanism comprises a vertical shaft and two horizontal shafts having eccentric protuberances. The vertical shaft comprises a first component having a pair of symmetric projective ears punching through the horizontal shaft and a cylinder body, a second component slipped onto the cylinder body and having a projective wall corresponding to the eccentric protuberance, and a third component also slipped onto the cylinder body. The first and second components interfere with each other to rotate synchronously. An elastic component is further disposed between the lower portion of the cylinder body and the bottom face of the third component.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 3:
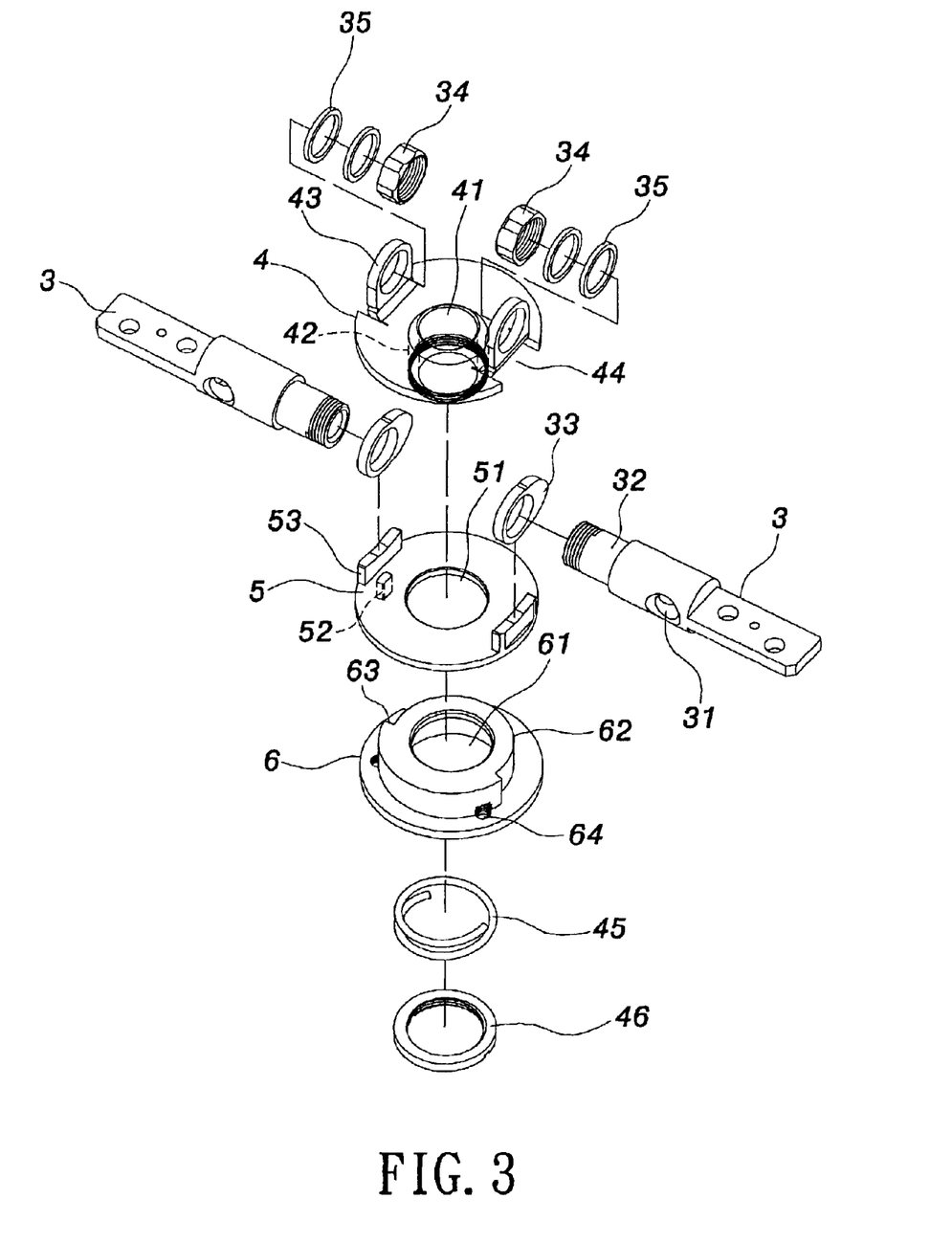
FIG. 3 is an exploded perspective view of a rotation shaft mechanism of the present invention.
Figure 4:
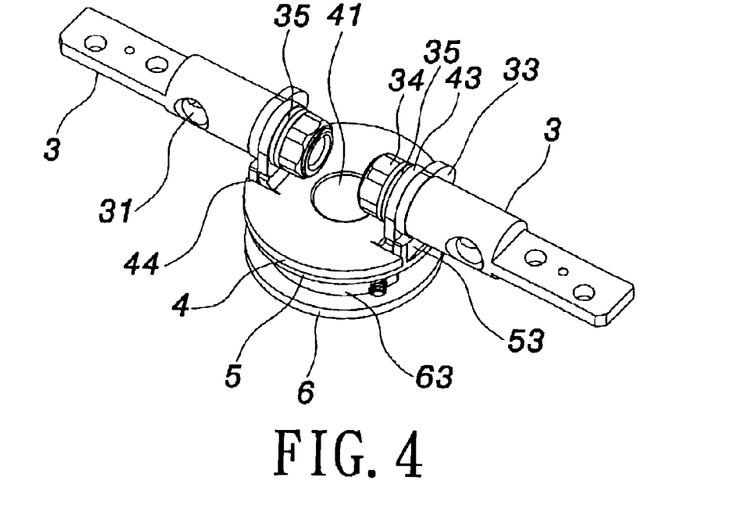
FIG. 4 is a perspective assembly view of a rotation shaft mechanism of the present invention.
Figure 5:
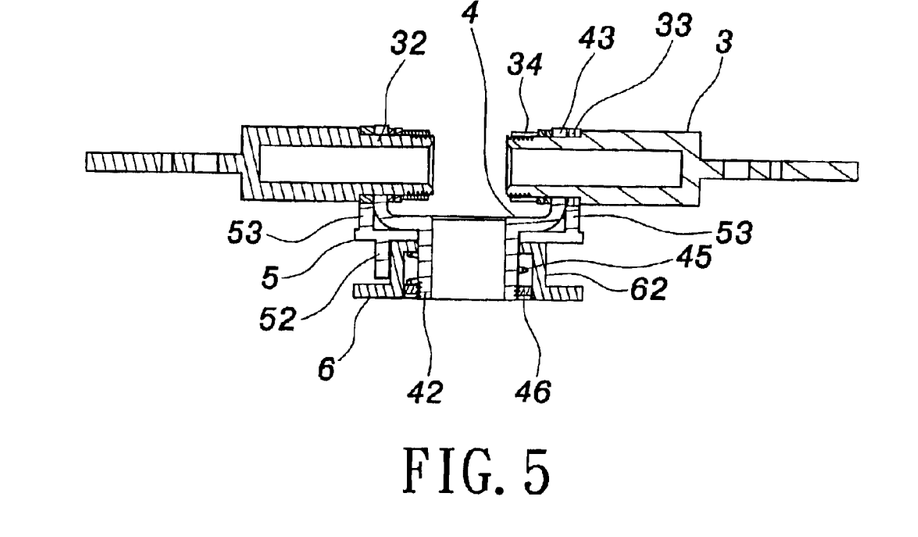
FIG. 5 is a cross-sectional view of a rotation shaft mechanism of the present invention before operations.

As shown in FIGS. 3 to 5, the present invention provides a rotation shaft mechanism of display portion of portable computer, which comprises a pair of horizontal shafts 3 and a vertical shaft. The vertical shaft comprises a first component 4, a second component 5, and a third component 6 shown in FIG. 3. The horizontal shafts are for helping to open up and close the covering (a display portion) of a portable computer, while the vertical shaft is for turning the display portion around after it is opened up.

A small-diameter portion 32 protrudes from one end portion of each of the horizontal shafts 3. An eccentric protuberance 33 protrudes from or is fixedly disposed (slipped onto and then soldered, pasted, or fastened) on the small-diameter portion 32. When the horizontal shafts 3 turn around, the eccentric protuberances 33 thereof are synchronously driven to turn. If the horizontal shafts 3 are used as the axis of rotation, the eccentric protuberances 33 on the horizontal shafts 3 are synchronously driven to rotate eccentrically. A hole body 31 disposed at each of the horizontal shafts 3 connects with the hollow interior portion of the horizontal shafts 3 so that an electric cable is able to be placed within the horizontal shafts 3.

The first component 4 has a pair of projective ears 43 disposed symmetrically, each of which has through holes, and gaps 44 disposed at positions corresponding to the projective ears 43. A pivotal hole 41 is disposed at the axis of the first component 4. A cylinder body 42 for pivotal connection is extended downwards from the pivotal hole 41. Threads are disposed at the outer edge of the lower portion of the hollow cylinder body 42.

The second component 5 also has a pair of projective walls 53 symmetrically disposed thereon and a pivotal hole 51 for being passed through by the cylinder body 42, and a bump 52 disposed at the bottom face thereof.

The third component 6 has a covering 62 including a pivotal hole 61 for being passed through by the cylinder body 42 on the top face thereof. Partial periphery of the covering 62 forms a flange 63. The third component 6 has also several screw holes 64 so that it can be fixedly disposed at base portion of a portable computer.

As shown in FIGS. 3 and 4, the corresponding projective ears 43 of the first component 4 pass through the small-diameter portions 32 of the pair of horizontal shafts 3. Free ends of the small-diameter portions 32 are screwed to fixing components 34 to clamp the projective ears 43 between the fixing components 34 and the eccentric protuberances 33 of the horizontal shafts 3. The degree of clamped tightness of the projective ear 43 and a disc-shaped spring 35 is controlled with respect to the degree of screwing tightness of the fixing component 34, consequently letting the horizontal shafts 3 to have the corresponding tightness while turning. Therefore, although the pair of horizontal shafts 3 are pivotally joined at the pair of projective ears 43 of the first component 4, they are turned with an appropriate degree of tightness so that the eccentric protuberances 33 thereon are synchronously driven to rotate with respect to the horizontal shaft 3, which serve as the axis under this circumstance. Opposite outer ends of the horizontal shafts 3 are fixedly disposed at a display portion of a portable computer so that the lift of the display portion is accomplished with respect to the horizontal shafts 3, which serve as the axis at this point.

Figure 5A:
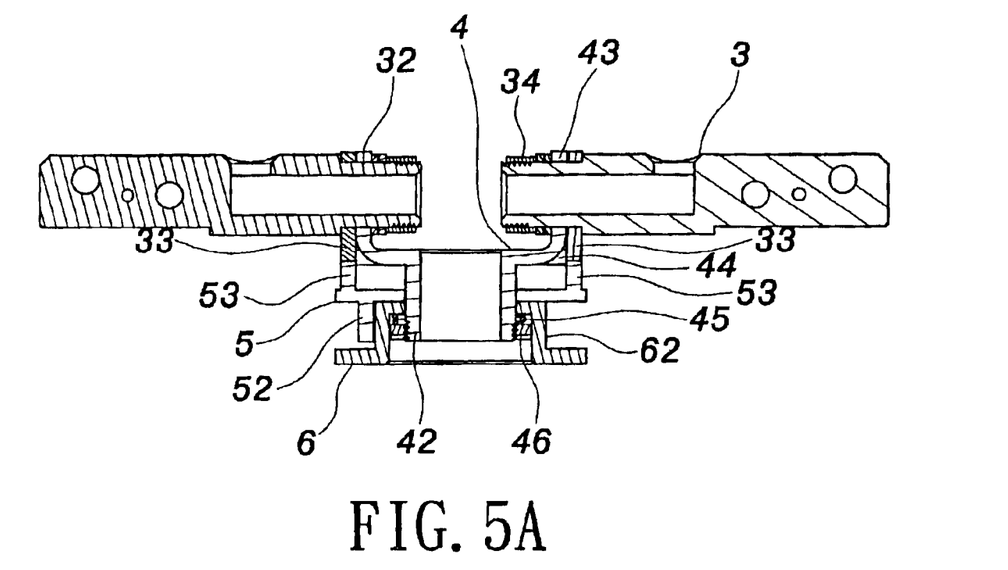
FIG. 5A is a cross-sectional view of a rotation shaft mechanism of the present invention after operations.

The cylinder body 42 of the first component 4 passes through the pivotal holes 51 and 61 of the second and third components 5 and 6, so as to allow the three components to be able to stack together up and down. Because the cylinder body 42 and the pivotal holes are circular, the first and second components 4 and 5 are turned around with respect to the cylinder body 42 serving as the axis. Moreover, the first component 4 moves up and down with respect to the cylinder body 42. The pair of projective walls 53 of the second component 5 extend into the corresponding gaps 44 of the first component 4 so that turning of the first component 4 can synchronously drive the second component 5 to rotate, as shown in FIG. 4. The pair of projective walls 53 of the second component 5 respectively correspond to but not go against the eccentric protuberances 33 of the pair of horizontal shafts 3, as shown in FIG. 5, so that turning of the second component 5 synchronously drives the eccentric protuberances 33 to rotate eccentrically and then abut against the upper edges of the projective walls 53, as shown in FIG. 5A, hence relatively upholding the first component 4. The bump 52 of the second component 5 is adjacent to the periphery of the covering 62 of the third component 6, and limited by the flange 63, posing a constraint to turning of the second component 5.

The cylinder body 42 of the first component 4 has a screw nut 46 screwed to the lower portion thereof, or formed monolithically a projective ring (not shown) located at the same position and functioning as well as the screw nut. An elastic component 45 is slipped onto the cylinder body 42. The elastic component 45 is elastically supported between the top wall of the covering 62 and the screw nut 46 (or the projective ring). As shown in FIGS. 5 and 5A, the first component 4 moves up and down with respect to the cylinder body 42. That is, when the first component 4 is not upheld yet, the elastic component 45 is at an extension state (FIG. 5). When the first component 4 is upheld to move upwards, the elastic component 45 shrinks synchronously to generate an elastic restoring force to counter the upward motion.

Figure 6:
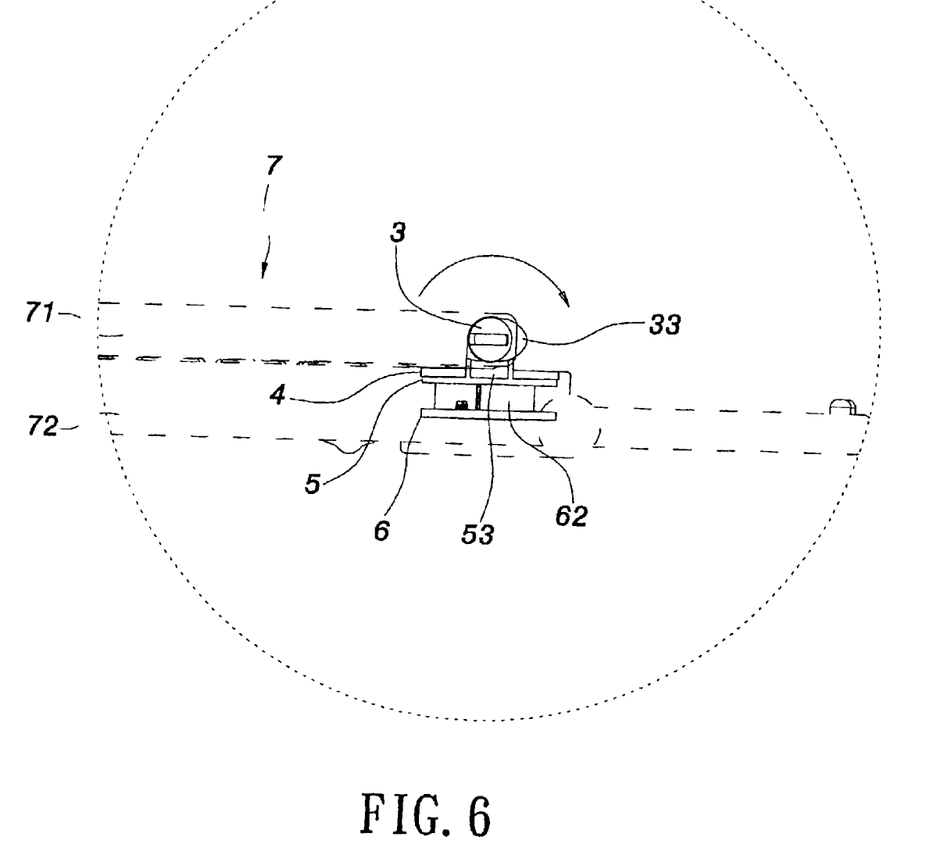
FIG. 6 is a side view showing that the present invention is applied to a portable computer and covering of the portable computer is closed.
Figure 8:
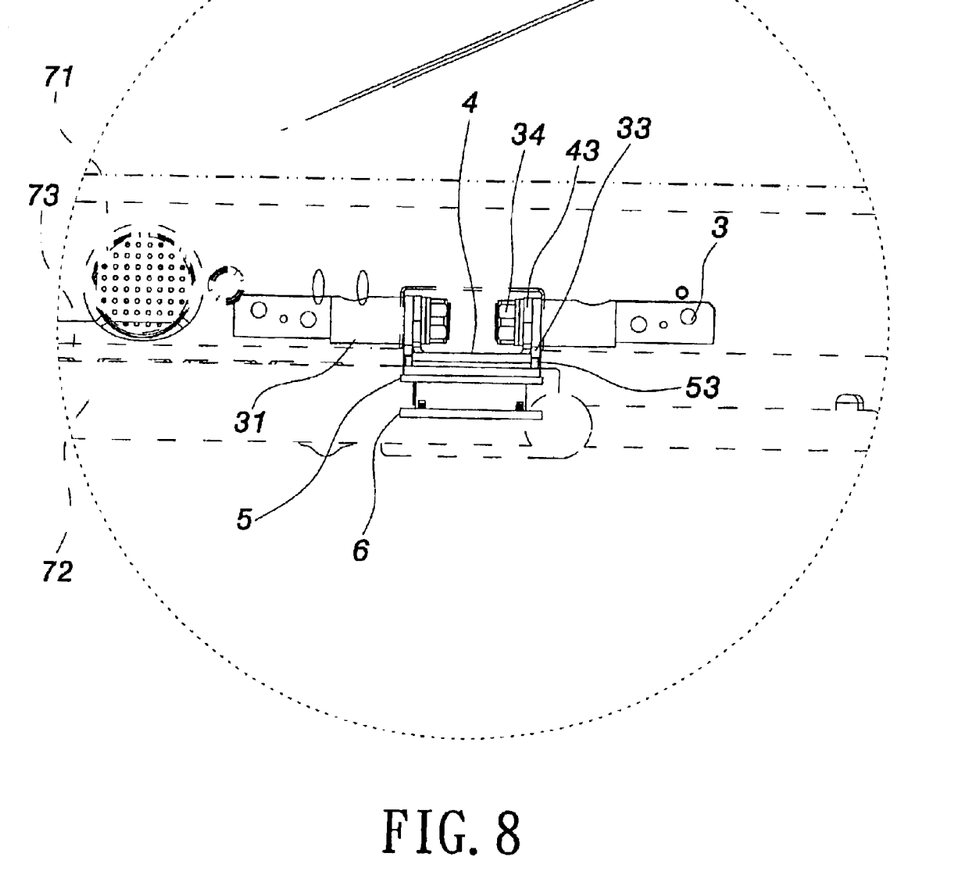
FIG. 8 is a side view of FIG. 7 after display portion of the portable computer has turned around by 90 degrees.

As shown in FIG. 6, a portable computer 7 includes a display portion 71 and a base portion 72 capable of being pivotally overlapped by said display portion 71 with a rotation shaft mechanism. Before the rotation shaft mechanism of the present invention operates, the eccentric protuberances 33 face toward the back direction of the rotation shaft mechanism, as shown in FIGS. 4 and 6. As shown in FIG. 6, the rotation shaft mechanism of the present invention applies to the portable computer 7. The third component 6 in the vertical shaft is screwed into the base portion 72 through the screw holes 64 shown in FIG. 3. The pair of horizontal shafts 3 in the rotation shaft mechanism are fixedly joined to the display portion 71 as shown in FIGS. 6 and 8. The rotation shaft mechanism thus is disposed between the display portion 71 and the base portion 72.

As shown in FIG. 6, for the portable computer 7 whose covering (display portion) is not lifted, the eccentric protuberances 33 in the rotation shaft mechanism thereof exactly face toward the direction extending from the bottom side of the display portion 71. Therefore, the eccentric protuberances 33 do not function on the corresponding projective walls 53 yet to uphold the display portion 71 as the display portion 71 has not been lifted.

Figure 7:
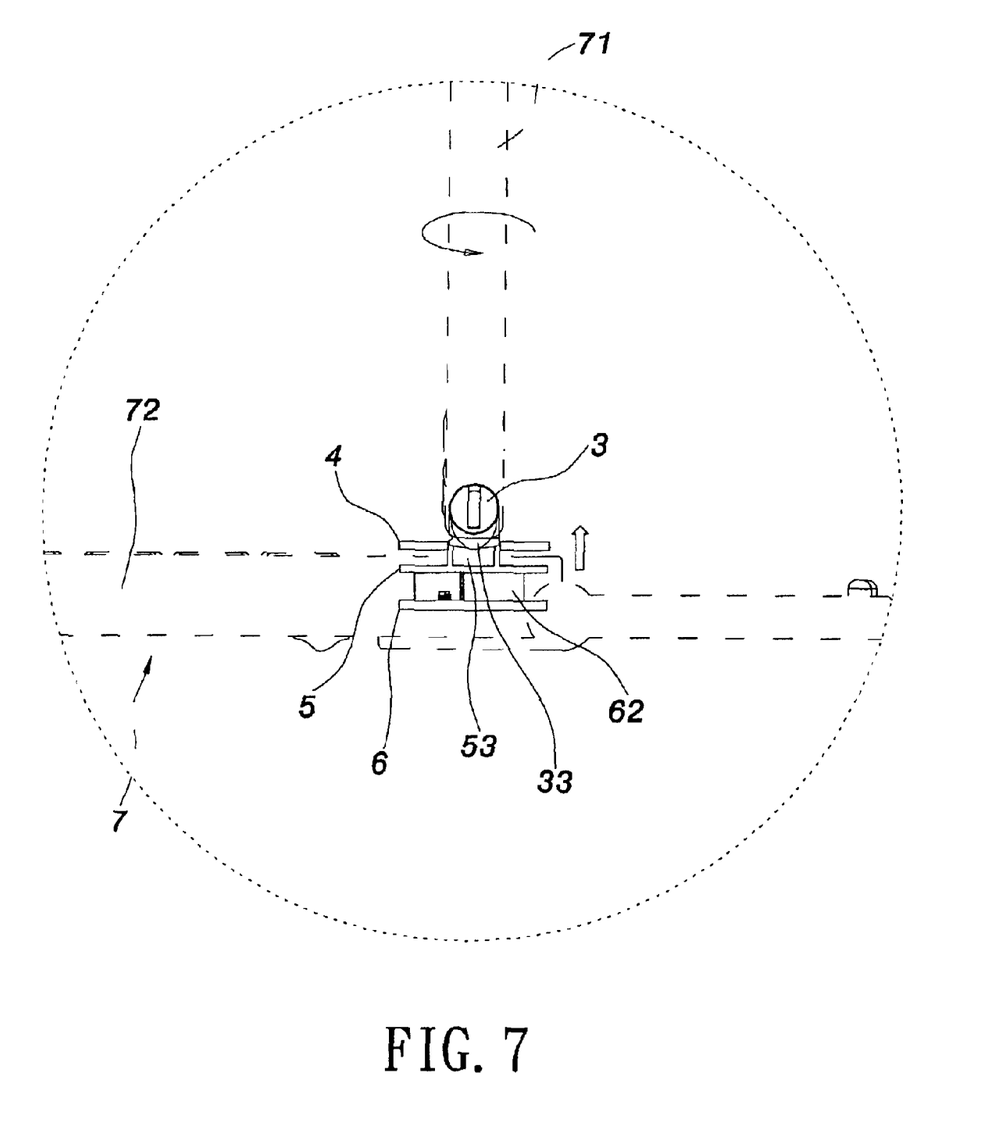
FIG. 7 is a side view of FIG. 6 after the covering is opened up.

Please refer to FIG. 7 in conjunction with FIGS. 5 and 5A. When a user lifts the display portion 71, the pair of horizontal shafts 3 are driven to rotate synchronously. During the rotation, the pair of horizontal shafts 3 further drives the eccentric protuberances 33 to rotate eccentrically in the same direction. Because the corresponding projective walls 53 are exactly below the eccentric protuberances 33, when the display portion 71 is lifted by 90 degrees as shown in FIG. 7, the eccentric protuberances 33 originally face rearwards will turn eccentrically to abut against the upper edges of the projective walls 53 and thus relatively uphold the first component 4, the pair of horizontal shafts 3 connected at the first component 4, and the display portion 71 fixedly connected at the pair of horizontal shafts 3. Meanwhile, the elastic component 45 will be pressed by the screw nut 46, so as to relatively move upwards to shrink into the state shown in FIG. 5A. Thereby, when the user lifts the display portion 71, the display portion 71 will be upheld to enlarge the distance between the bottom side thereof and the surface of the base portion 72, as shown in FIG. 7. Moreover, because of the elastic restoring force of the elastic component 45, this kind of upholding is not of a loose state. In other words, after the display portion 71 is lifted and then relatively upheld, there will be no loose state between the display portion 71 and base portion 72.

As described above, when the user lifts the display portion 71, the display portion 71 will be upheld to enlarge the distance between the bottom side thereof and the surface of base portion 72. As shown in FIG. 8, when the display portion 71 is turned around, it will not contact and rub against the top surface of base portion 72. There will be a spacing 73 formed between the bottom side of the display portion 71 and the top surface of base portion 72 after the display portion 71 is upheld. Therefore, the bottom side of the display portion 71 will never contact and rub against the surface of the seat portion 72.

As shown in FIGS. 4 and 5, because the pivotal holes 51 and 61 of the second and third components 5 and 6 are passed through by the cylinder body 42 of the first component 4, and the first and second components 4 and 5 interfere with each other by taking advantage of the gaps 44 and the projective walls 53, when the display portion 71 is lifted and the first component 4 is driven to rotate (as shown in FIG. 5A), the eccentric protuberances 33 and the projective walls 53 will simultaneously interfere in the corresponding gaps 44 to synchronously drive the second component to rotate, hence accomplishing rotation of the vertical shaft. Furthermore, the magnitude of rotation of the vertical shaft is limited by the bumps 52 of the second component 5 and the flanges 63 of the third component 6, hence avoiding breakage of electric cable due to over-rotation.

As shown in FIGS. 3 and 8, an electric cable (not shown) between the display portion 71 and base portion 72 first penetrates into the hollow portions of the horizontal shafts 3 via the hole bodies 31 of the horizontal shafts 3, protrudes out of the end portions of the small-diameter portions 32 of the horizontal shafts 3, and then penetrates into the pivotal holes 41, 51, and 61, so as to achieve electric connection in the base portion 72.

To sum up, through the structure of the present invention, the display portion 71 is relatively upheld to enlarge the distance between the bottom side of the display portion 71 and the top surface of base portion 72 at the same time when the display portion 71 is lifted. During the rotation, the display portion 71 will never contact and rub against the top surface of the base potion 72, and will never be stuck by keys on the top surface of base portion 72 either. Moreover, when the display portion 71 is turned around, no non-smooth rotation occurs. On the contrary, when the display portion 71 is not lifted, the display portion 71 will not be upheld because the eccentric protuberances 33 no longer support between the horizontal shafts 3 and the projective walls 53. Therefore, the display portion is completely engages with the base portion. Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A rotation shaft mechanism adapted for a portable computer having a display portion, a base portion and at least one rotation shaft mechanism arranged between the display portion and the base portion, the rotation shaft mechanism comprising a horizontal shaft assembly and a vertical shaft assembly;

wherein the horizontal shaft assembly has two horizontal shafts and two eccentric protuberances arranged on the two horizontal shafts, respectively;

wherein the vertical shaft assembly includes:

a first component having a first body, a pair of symmetric projective ears perpendicularly projected from two sides of the first body and a cylinder body disposed at a bottom of the first body, and the pair of projective ears having two holes which the horizontal shafts passes through, respectively;

a second component which the cylinder body is removably mounted on and having two projective wall formed thereon to be corresponding to the two eccentric protuberances of the horizontal shaft assembly, and the first component and the second component interfering with each other so as to rotate synchronously; and a third component which the second component is mounted on; and an elastic component surrounded on the cylinder body and disposed between a screw nut screwed at a lower portion of said cylinder body and a bottom face of the third component.

2. The rotation shaft mechanism as claimed in claim 1, wherein said eccentric protuberance is slipped onto said horizontal shaft, said projective ears of said first component are clamped between said eccentric protuberances and a screw nut type fixing component, and said fixing component is screwed to said horizontal shaft.

3. The rotation shaft mechanism of a display portion of a portable computer as claimed in claim 1, wherein said first component has two symmetric gaps for being extended by said projective walls.

4. The rotation shaft mechanism of a display portion of a portable computer as claimed in claim 1, wherein said first component has a gap corresponding to said projective wall, and said projective wall extends into said gap.

5. The rotation shaft mechanism of a display portion of a portable computer as claimed in claim 1, wherein said third component has a covering having formed a pivotal hole thereon for slipping into said cylinder body.

6. The rotation shaft mechanism of a display portion of a portable computer as claimed in claim 5, wherein said elastic component is slipped onto said cylinder body of said first component, a screw nut is screwed to a lower portion of said cylinder body, and said elastic component elastically supports between a top wall of said covering and said screw nut.

7. The rotation shaft mechanism of a display portion of a portable computer as claimed in claim 5, wherein a flange is formed at a partial periphery of said covering, and said second component has a bump adjacent to the periphery of said covering.

8. The rotation shaft mechanism as claimed in claim 1, wherein said horizontal shaft has a hole formed on a wall thereof in communication with a hollow inner portion thereof, said components of said vertical shaft assembly have connected pivotal holes, and an electric cable between said display portion and a seat portion passes through said hole and the hollow inner portion and said pivotal holes.

* * * * *